June 2, 1936. C. F. REIS 2,043,010
MAGNETO ROTOR ASSEMBLY
Filed June 25, 1934
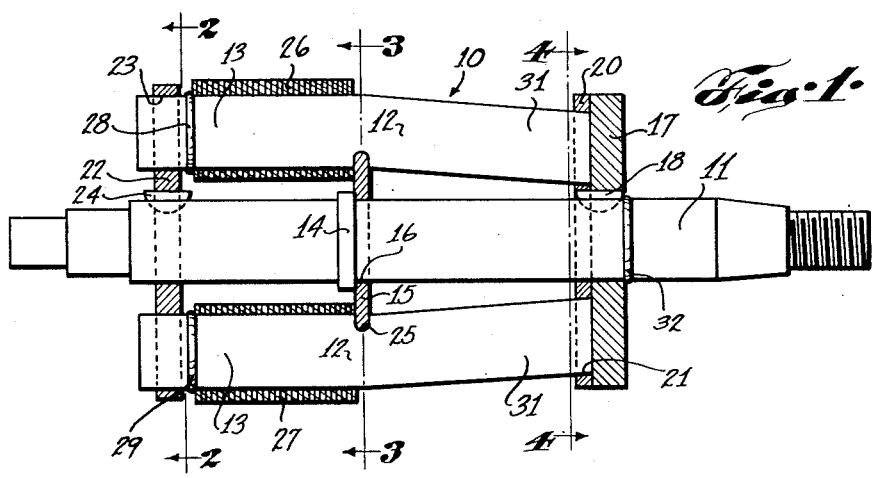
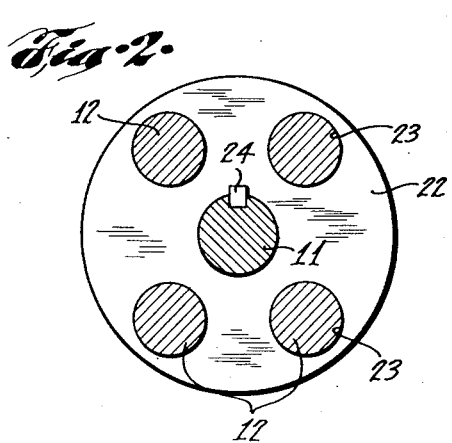
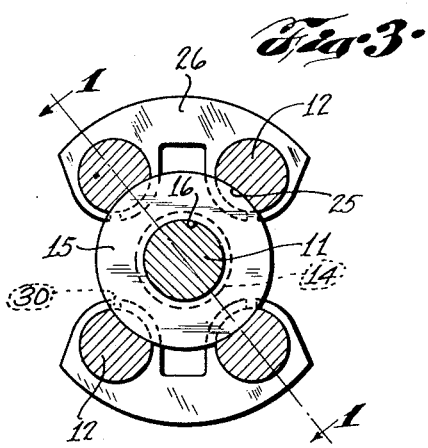
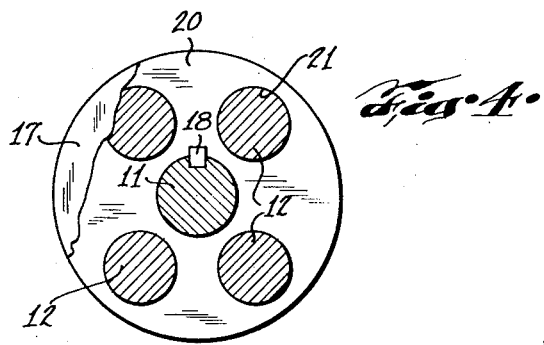
INVENTOR.
CURT F. REIS
BY
ATTORNEY.

Patented June 2, 1936

2,043,010

UNITED STATES PATENT OFFICE 2,043,010

MAGNETO ROTOR ASSEMBLY

Curt F. Reis, Beloit, Wis., assignor to Fairbanks, Morse & Company, Chicago, Ill., a corporation of Illinois Application June 25, 1934, Serial No. 732,295

5 Claims. (Cl. 171—252)

This invention relates to improvements in magneto rotor assemblies, and more particularly to an improved rotor construction for machines of the rotating field type, in which bar magnets or the like cooperate with a fixed generating winding.

In magnetos of the general type under discussion, it is desirable to utilize permanent magnets in the form of bars of cobalt steel or some comparable metal possessing a highly magnetic retentivity. Such metals however present a production difficulty because of their extreme hardness and consequent difficulty of machining and thus present a disadvantage in the securement of the pole pieces or bars into the rotor assembly. Certain earlier types of rotor constructions embodying permanent magnets have utilized screws or other similar fastening expedients for securing the permanent magnets and associated parts into assembly with the rotor shaft. Needless to say, the drilling and tapping operations incident to the use of screw threaded holding elements are a source of considerable expense when employing material of the hardness characterizing cobalt steel magnet bars. The use of threaded holding elements offers the further difficulty that they tend to become loose and ineffective due to vibration attending the operation of the machine. It is accordingly an object of the present invention to provide an improved rotor for magnetos of the rotating magnet type, such that the rotor parts may be assembled in fixed relation without employing bolts, screws, or other threaded holding elements.

A further object of the invention is attained in an improved arrangement of magnet bars or pole pieces in a magneto rotor of the type noted, such that the overall length of the rotor may be reduced in proportion to the length of metal employed in the bars, or conversely stated, in a rotor of given length, longer pole pieces may be utilized to enhance the strength of the magnetic field.

Yet another object of the invention is attained in a rotor construction such that the elements of the rotor apart from the shaft, may be substantially completely assembled and thereafter secured as a unit to the shaft, without requiring the use of threaded holding elements of any form.

A still further object of the invention is realized in a rotor of minimum weight and number of parts, and wherein the cage structure of a permanent-magnet rotor is of unusual lightness and strength.

Additional objects and advantages will appear from the following detailed description of a preferred embodiment of the invention, considered in connection with the accompanying drawing, in which:

Fig. 1 is a longitudinal section of a preferred form of rotor embodying the principles of the present invention, the section of this figure being taken along line 1—1 of Fig. 3, and Figs. 2, 3, and 4 are transverse sections through the assembly of Fig. 1, as viewed respectively along lines 2—2, 3—3, and 4—4 of Fig. 1.

Referring by numerals of reference to the drawing, there is designated generally at 10, a rotor of a type employing permanently magnetized bars, the rotor including a magneto or rotor shaft 11, formed, by preference, of mild steel or other material of substantial strength and rigidity. A plurality of pole pieces or permanent magnet bars 12 are arranged in spaced relation to each other, and also spaced from the shaft, the bars 12 being preferably characterized by end portions 13 substantially parallel to each other, and to the shaft. The pole pieces or bars 12 are preferably formed of cobalt steel or other highly retentive magnetic material. The bars are shown as being of circular cross section, which possesses certain advantages, among others in facilitating the few necessary machining or grinding operations. The illustrated embodiment utilizes four of the bars or pole pieces, although it will of course be understood that the number may be varied, depending upon the type and number of poles of the magneto in which the rotor is to be utilized.

Between the ends of shaft 11 is provided an abutment, such as a shoulder 14 which is laterally engaged by a holding and location plate 15 centrally apertured as at 16 so as to receive, but snugly engage the shaft 11. The location plate 15 is formed, by preference, of a suitable non-magnetic metal or material.

Spaced along the shaft from the plate 15 is a disc or base plate of magnetic metal indicated at 17, and which serves magnetically to bridge the bars 12. The disc 17 is positioned to the shaft and compelled to rotate therewith as by a key 18 fitted in the usual keyway 19.

The ends of the bars 12 adjacent the plate or disc 17 are received in openings through a plate 20 which is laterally contiguous to the plate 17, the plate 20 being provided with circumferentially spaced apertures 21, the metal adjacent which embraces one end of each of the bars 12. The plate 20 may be formed of a magnetic metal.

At the opposite end of the rotor assembly is a face plate 22 apertured as at 23, to receive the corresponding ends of bars 12, the bars being extended therethrough and slightly beyond the apertures 23. The plate 22, consisting of a disc of non-magnetic metal or material, is keyed as by the element 24 to the corresponding end of the magneto shaft.

As will appear from Figs. 1 and 3, each of the bars 12 is preferably arcuately recessed as at 25 so as to receive an edge portion of the disc 15. It will thus appear that the holding and location plate 15 serves as an intermediate bridge serving to position and maintain the spacing of the bars 12 radially of the assembly, and because of the abutting relation between plate 15 and shoulder 14, will serve also to prevent endwise movement of the bars. The plate 15 may also serve the further function of an abutment for the laminated pole shoe structures 26 and 27, each of these pole shoes consists of a plurality of stacked laminæ, those of each shoe embracing and magnetically interconnecting in pairs the free ends of bars 12 of like polarity.

With the plate 15 assembled to the bars, the laminations of the shoes 26 and 27 are assembled by stacking over the bars and, following the application of suitable pressure, are held in place along the bars through the agency of snap rings 28 and 29, each seated in a suitable groove therefor on one of the bars 12. The resilience of the rings as seated in the bars, serves to maintain the rings in place, so that they constitute abutments at one end of each of the pole shoes. Under certain circumstances it is possible to groove the magnet bars peripherally at the location determined upon for the end laminations and by providing laminations which normally incompletely embrace the bars, (as shown by notch 30, Fig. 3), the end laminations may then be employed in lieu of the snap rings to position the shoes along the bars.

According to preference, the bars 12, while provided with parallel end portions 13 receiving the shoes, are preferably distorted, bent, or bowed slightly so that their opposite ends 31 are brought into converging relation to each other and to the shaft, it being noted that the radial distance of the centers of openings 21, from the shaft axis, (Fig. 4) is less than the corresponding distance of the openings 23 in plate 22, (Fig. 2). By this expedient I am enabled, without increasing the overall length of the rotor, to utilize a greater length of metal in each of the bars 12.

It will appear from the description of parts and means for securing them into assembly that if desired, the rotor elements may be assembled apart from the shaft 11 and later brought into assembled relation to the shaft by movement of the cage or rotor from right to left, as the parts are related in Fig. 1, until the plate 15 abuts the shoulder 14, which is either fixed to or formed as a part of the shaft. The keys 18 and 24 may then be introduced in the usual manner and the parts of the assembly secured together as by the agency of a snap ring 32 seated in a suitable peripheral groove therefor on the shaft 11 at the location of this ring in Fig. 1. My preference is to subject the parts of the rotor to a certain endwise compression in a direction to the left of Fig. 1, so that the holding end location plate 15 is firmly seated against the shoulder 14, while the plate 17 firmly abuts the ends of the bars 12. With the snap ring 32 then put into place, the parts of the rotor are assembled under at least a slight compression and thus firmly held against any possibility of casual disengagement.

The present invention constitutes certain improvements over the type of rotor exemplified by the disclosure of Patent No. 1,843,222 to Thos. J. Harley, February 2, 1932. While the invention has been described by making detailed reference to a preferred embodiment, numerous changes may be made in the parts, their combination and assembly, without departing from the intended scope of the invention as defined by the appended claims.

I claim:

1. A magneto rotor of the permanent magnet type, including a plurality of spaced bar magnets, separate plates supporting the end portions of said bar magnets, an intermediate plate bridgingly supporting the bar magnets and in interengaging relation therewith between their ends, a shaft to which the plates are secured, and pole shoes abutting the intermediate plate and connecting certain of the bar magnets near one end of the rotor, the bar magnets over portions of their length being in converging relation to each other and to the shaft, and having other portions by which the pole shoes are carried, disposed in substantially parallel relation to each other and to the shaft.

2. In a rotor for a magneto of the rotating field type, a shaft, a plurality of magnet bars extended along and spaced from the shaft, a pair of discs carried by the shaft near the ends of, and engaging the bars, a third disc on the shaft between the ends of the bars, the bars and third disc being in interengaging relation to prevent their relative displacement axially of the rotor, means associated with one of the end discs for positioning one end of each of the magnet bars in converging relation to each other and to the axis of the shaft, and pole shoes interconnecting the bars of like polarity, the said third disc providing an abutment for one end of each of the pole shoes.

3. In a rotor for a magneto of the rotating field type, a shaft, a plurality of magnet bars extended along and spaced from the shaft, a pair of bar-supporting discs carried by the shaft near the ends of the bars, one of said discs being of a magnetic metal, and the other of a non-magnetic metal, an intermediate disc carried by the shaft between the ends of the bars, the bars being slotted to receive marginal portions of the last said disc, means associated with one of the end discs, embracing one end of each of the magnet bars and securing said bars in converging relation to each other and to the axis of the shaft, and laminated pole shoes interconnecting in pairs, the bars of like polarity.

4. In a rotor for a magneto of the rotating field type, a shaft, a plurality of magnet bars extended along and spaced from the shaft, a pair of bar-supporting discs carried by the shaft near the ends of the bars, one disc being of a magnetic metal and the other of a non-magnetic metal, an intermediate disc carried by the shaft between the ends of the bars, the bars interengaging the periphery of the intermediate disc and being bent inwardly beyond one side of the intermediate disc, an element on the shaft providing an abutment for the other side of the intermediate disc, and laminated pole shoes on the bars located at one side of the intermediate disc.

5. In a rotor for a magneto of the rotating field type, a shaft, a plurality of magnet bars extended along and spaced from the shaft, a pair of bar-supporting discs secured to the shaft near the ends of the bars, one disc being of a magnetic metal and the other of a non-magnetic metal, an intermediate disc of non-magnetic material carried by the shaft between the ends of the bars, the bars interengaging the periphery of the intermediate disc and being bent inwardly of the rotor beyond one side of the intermediate disc, a projection on the shaft providing an abutment for the other side of the intermediate disc, laminated pole shoes carried on the bars and abutting the last said side of the intermediate disc, and a holding member embracing the shaft and exteriorly abutting one of the end discs.

CURT F. REIS.